(12) United States Patent
Doronichev et al.

(10) Patent No.: US 11,269,110 B2
(45) Date of Patent: Mar. 8, 2022

(54) COMPUTING SYSTEM ASSESSMENT OF GEOLOGICAL SIMILARITY OF WELLS EMPLOYING WELL-LOG DATA

(71) Applicant: Schlumberger Technology Corporation, Sugar Land, TX (US)

(72) Inventors: Sergey Doronichev, Menlo Park, CA (US); Velizar Vesselinov, Katy, TX (US); Valerian Guillot, Montpellier (FR); Xiaotong Suo, Stanford, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 582 days.

(21) Appl. No.: 16/211,119

(22) Filed: Dec. 5, 2018

(65) Prior Publication Data

US 2020/0183044 A1 Jun. 11, 2020

(51) Int. Cl.
| | |
|---|---|
| *G01V 5/04* | (2006.01) |
| *G01V 5/12* | (2006.01) |
| *G01V 99/00* | (2009.01) |
| *G01V 11/00* | (2006.01) |
| *E21B 47/00* | (2012.01) |
| *E21B 41/00* | (2006.01) |

(52) U.S. Cl.
CPC ............ *G01V 5/045* (2013.01); *G01V 5/12* (2013.01); *G01V 99/00* (2013.01); *E21B 41/00* (2013.01); *E21B 47/00* (2013.01); *G01V 11/00* (2013.01)

(58) Field of Classification Search
CPC .......... G01V 5/045; G01V 99/00; G01V 5/12; G01V 11/00; E21B 41/00; E21B 47/00
See application file for complete search history.

(56) References Cited

U.S. PATENT DOCUMENTS

| | | | |
|---|---|---|---|
| 10,139,507 B2 * | 11/2018 | Wahrmund | ............... G01V 1/30 |
| 2001/0036294 A1 | 11/2001 | Keskes et al. | |
| 2008/0140319 A1 | 6/2008 | Monsen et al. | |
| 2012/0234554 A1 | 9/2012 | Kumaran | |
| 2014/0316706 A1 * | 10/2014 | Grant | ...................... G01V 1/362 |
| | | | 702/11 |
| 2016/0090825 A1 * | 3/2016 | Imhof | ..................... E21B 43/00 |
| | | | 703/10 |

OTHER PUBLICATIONS

Lallier, et al., Uncertainty assessment in the stratigraphic well correlation of a carbonate ramp: Method and application to the Beausset Basin, SE France, Comptes Rendus Geoscience, vol. 348, Issue 7, pp. 1-11.

(Continued)

*Primary Examiner* — Daniel R Miller
*Assistant Examiner* — Christian T Bryant
(74) *Attorney, Agent, or Firm* — Michael Guthrie

(57) ABSTRACT

Computing system assessment of geological similarity of wells employing well-log data includes receiving logs with chronostratigraphic markers, and extracting signatures from the logs using the chronostratigraphic markers. A distance matrix is generated from the signatures using dynamic time warping. Using the distance matrix, a set of clusters are generated. The set of clusters are presented with an image.

20 Claims, 11 Drawing Sheets

(56) References Cited

OTHER PUBLICATIONS

Zhou, et al., "Implementation of multivariate clustering methods for characterizing discontinuities data from scanlines and oriented boreholes," Computers & Geosciences, vol. 28, Issue 7, pp. 827-839, Aug. 2002.
International Search Report and Written Opinion for the counterpart International patent application PCT/US2019/064002 dated Mar. 19, 2020.
International Preliminary Report on Patentability dated Jun. 17, 2021 for the equivalent PCTUS2019064002 (8 pages).

* cited by examiner

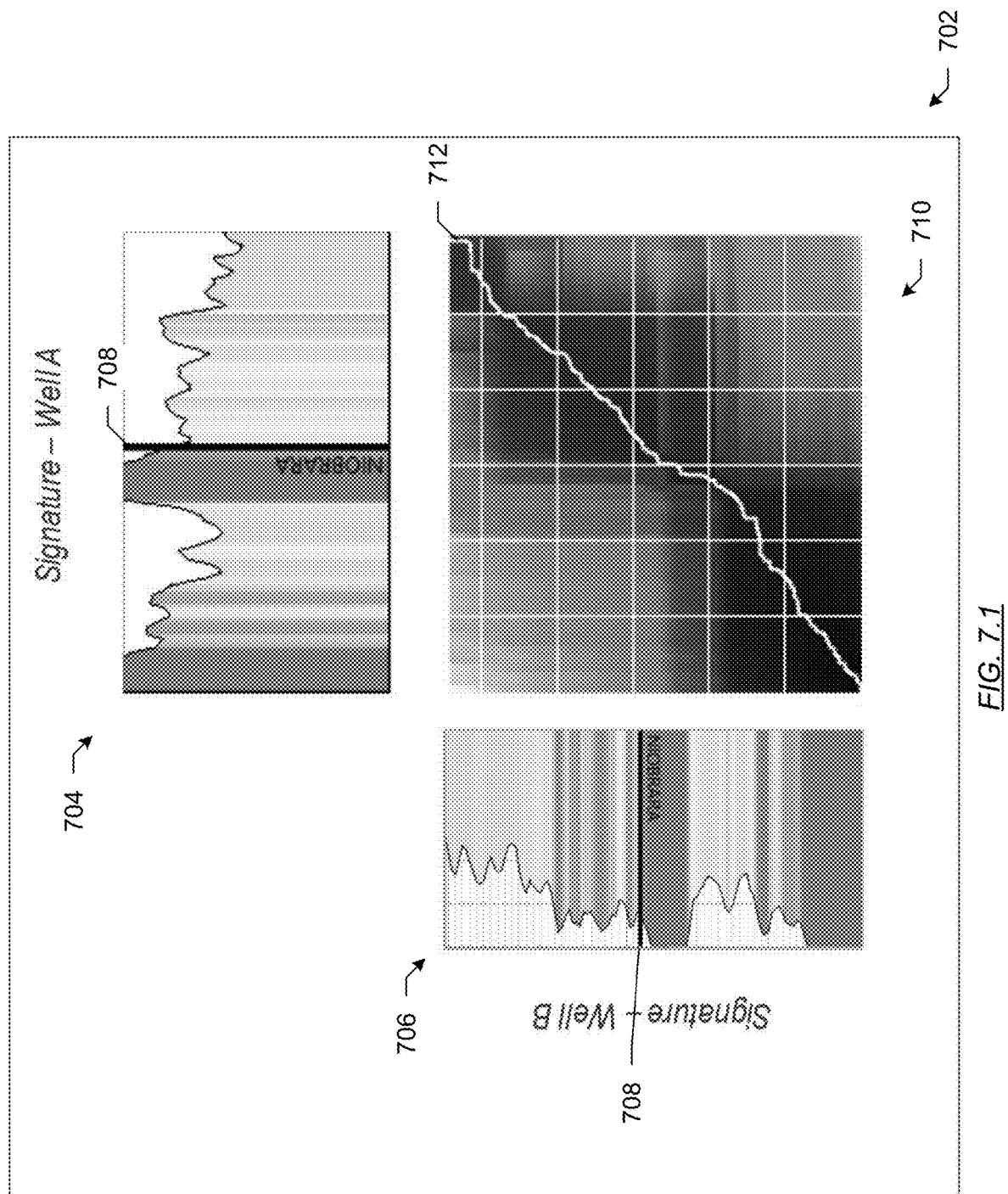
FIG. 7.1

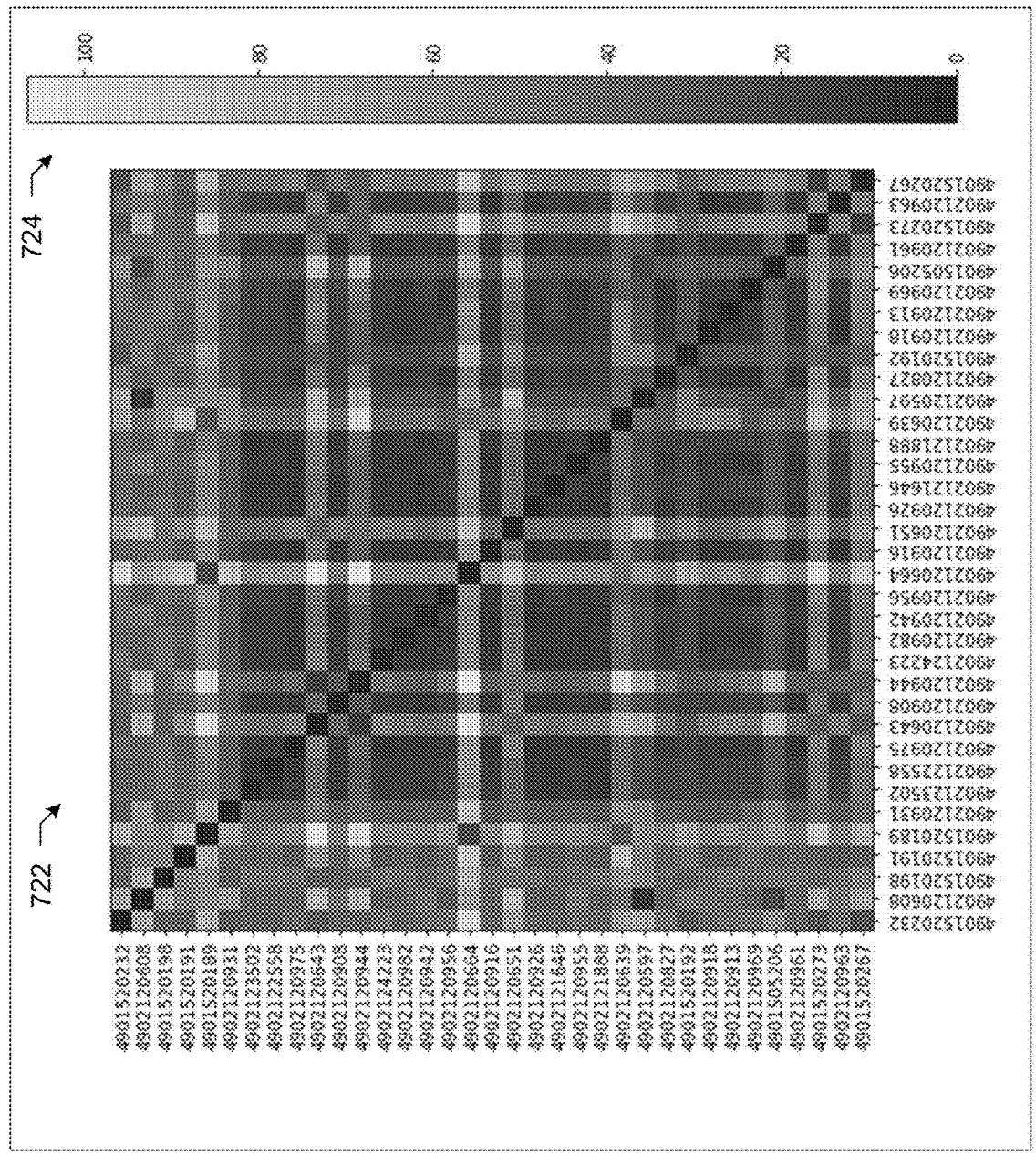
FIG. 7.2

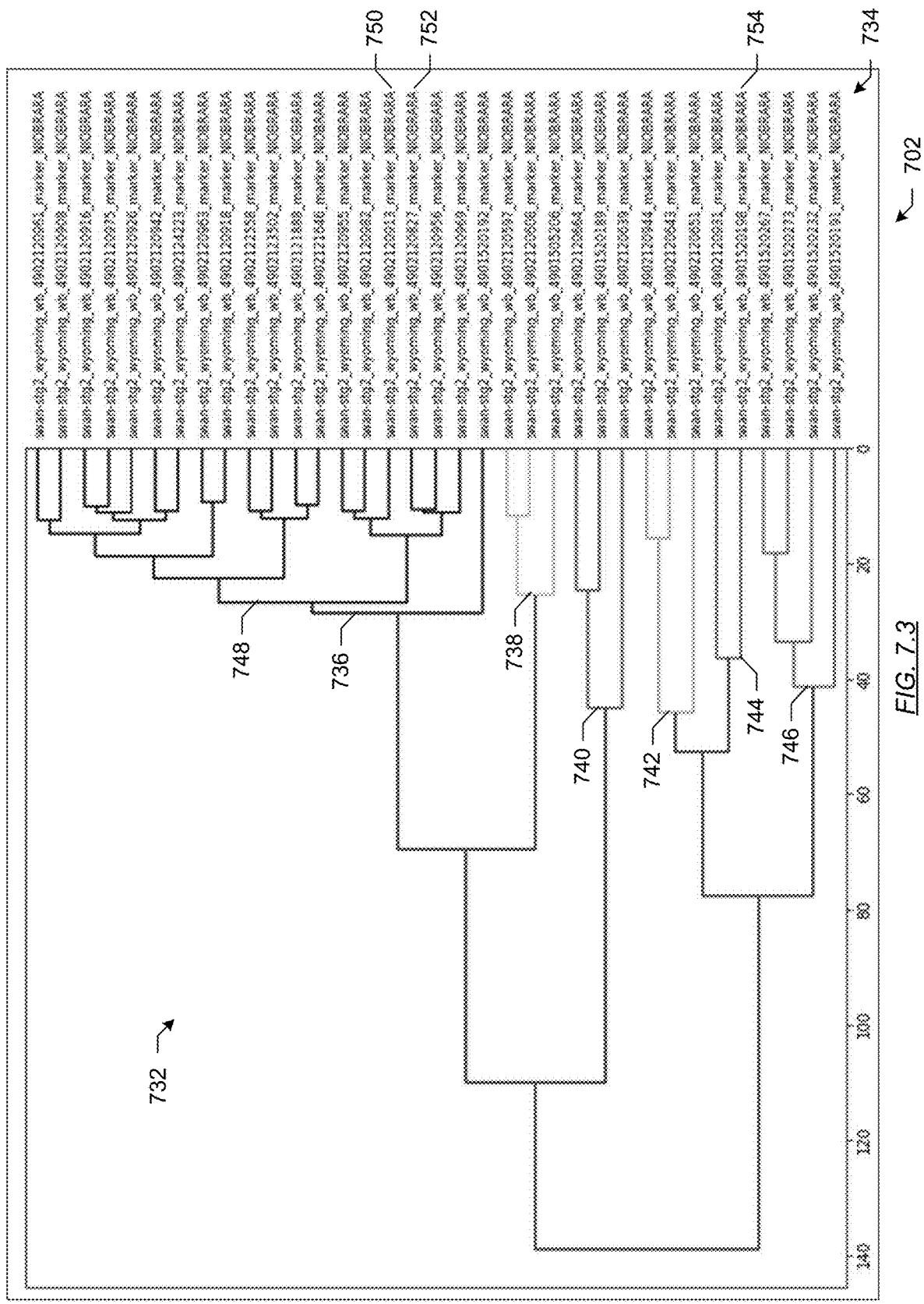
FIG. 7.3

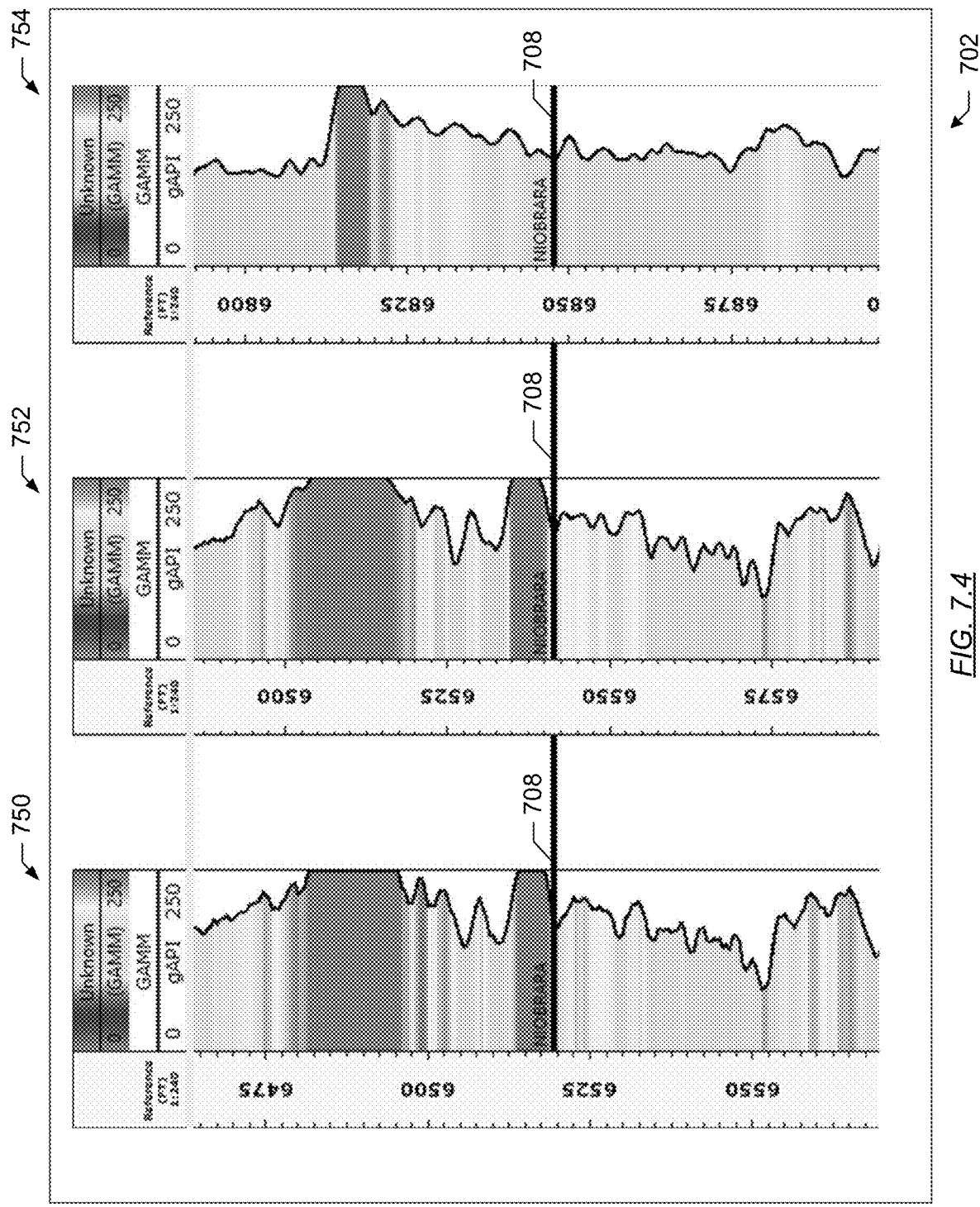
FIG. 7.4

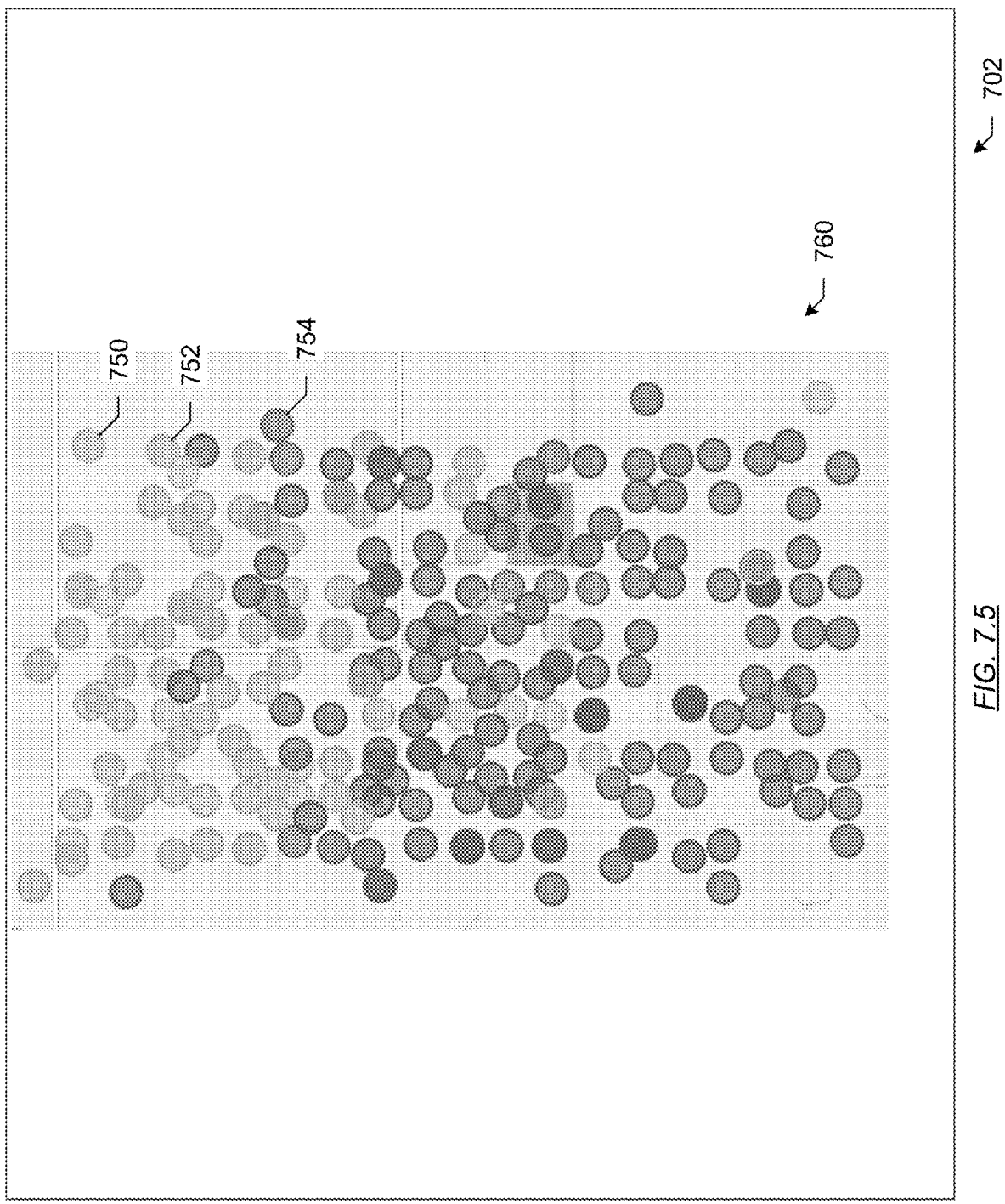
FIG. 7.5

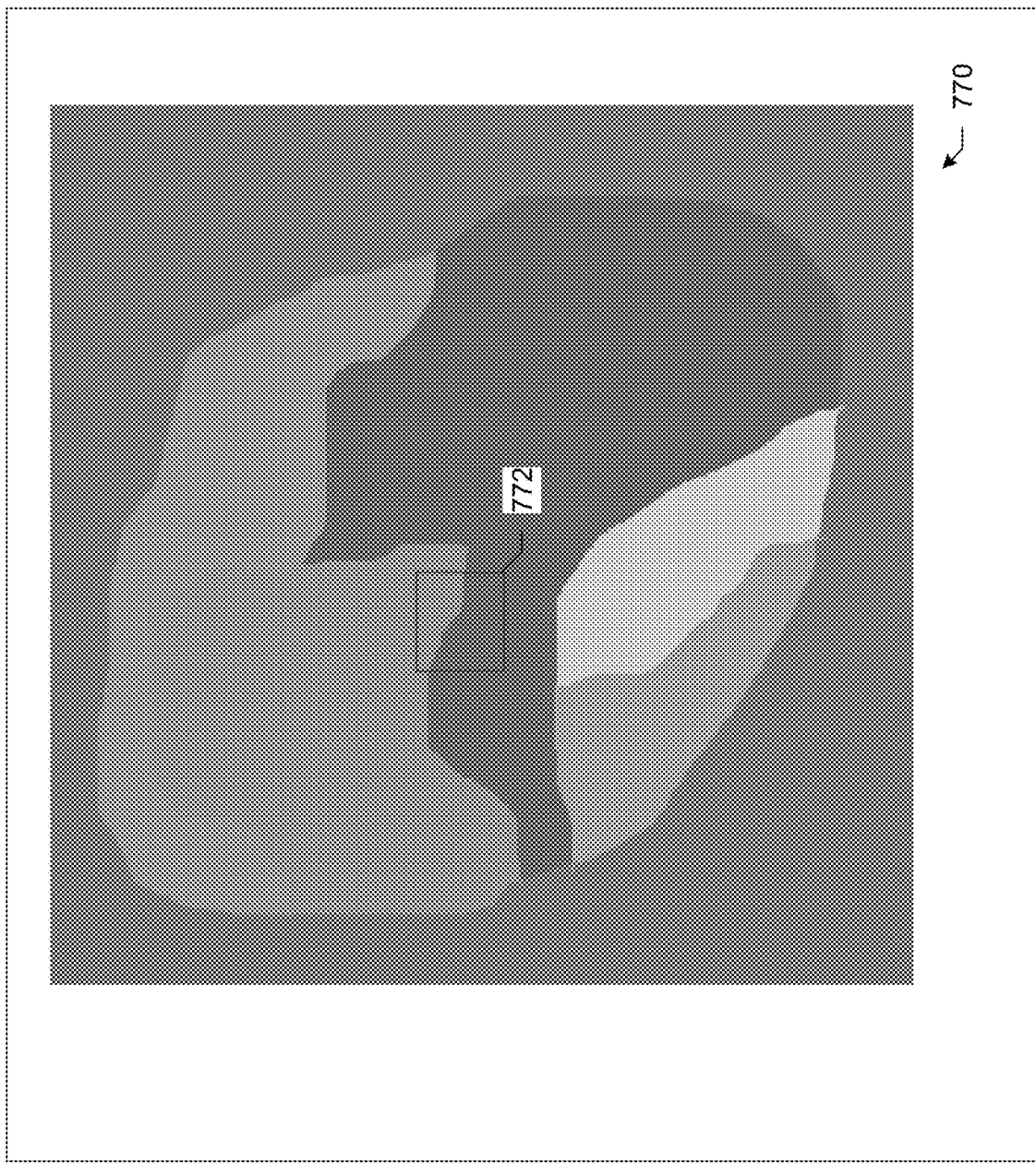
FIG. 7.6

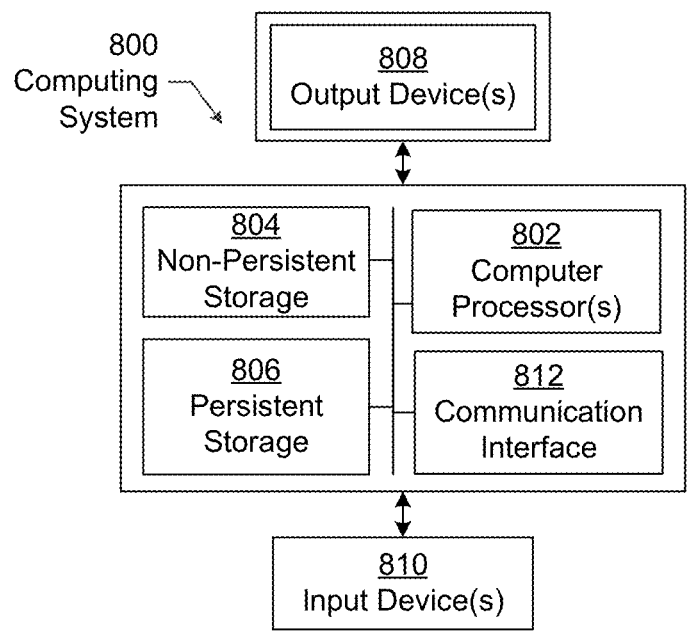
FIG. 8.1
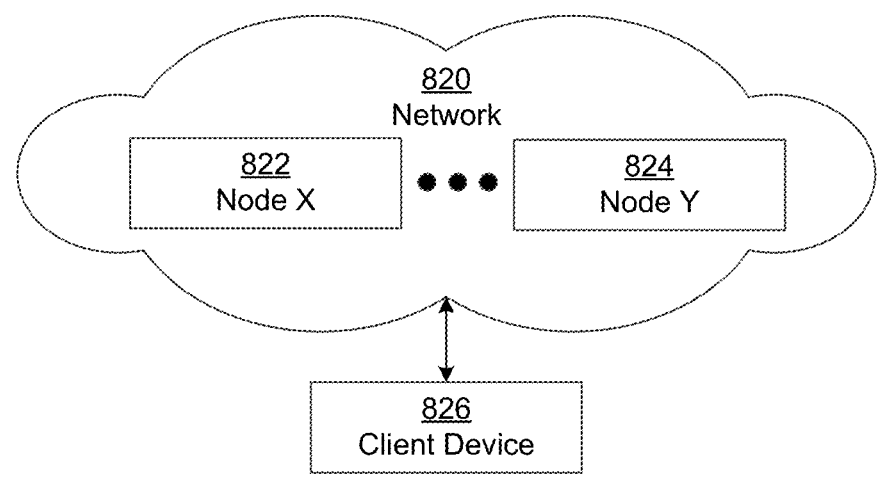
FIG. 8.2

COMPUTING SYSTEM ASSESSMENT OF GEOLOGICAL SIMILARITY OF WELLS EMPLOYING WELL-LOG DATA

BACKGROUND

Well logs, including gamma-ray logs, record characteristics of wells as a function of borehole depth. The geologic activity that leads to the formation of the stratigraphic layers of rock for each well may be different. At different wells, the same stratigraphic layers can occur at different depths and include variations within the stratigraphic layers. A challenge exists in having a computer system compare well logs from multiple wells with stratigraphic layers at different depths and with variations within the stratigraphic layers.

SUMMARY

In general, in one or more aspects, the disclosure relates to computing system assessment of geological similarity of wells employing well-log data. The computing system assessment includes receiving logs with chronostratigraphic markers, and extracting signatures from the logs using the chronostratigraphic markers. A distance matrix is generated from the signatures using dynamic time warping. Using the distance matrix, a set of clusters are generated. The set of clusters are presented with an image.

Other aspects of the disclosure will be apparent from the following description and the appended claims.

BRIEF DESCRIPTION OF DRAWINGS

FIGS. 7.1, 7.2, 7.3, 7.4, 7.5, and 7.6 show an example in accordance with disclosed embodiments.

FIGS. 8.1 and 8.2 show computing systems in accordance with disclosed embodiments.

DETAILED DESCRIPTION

Figure 1:
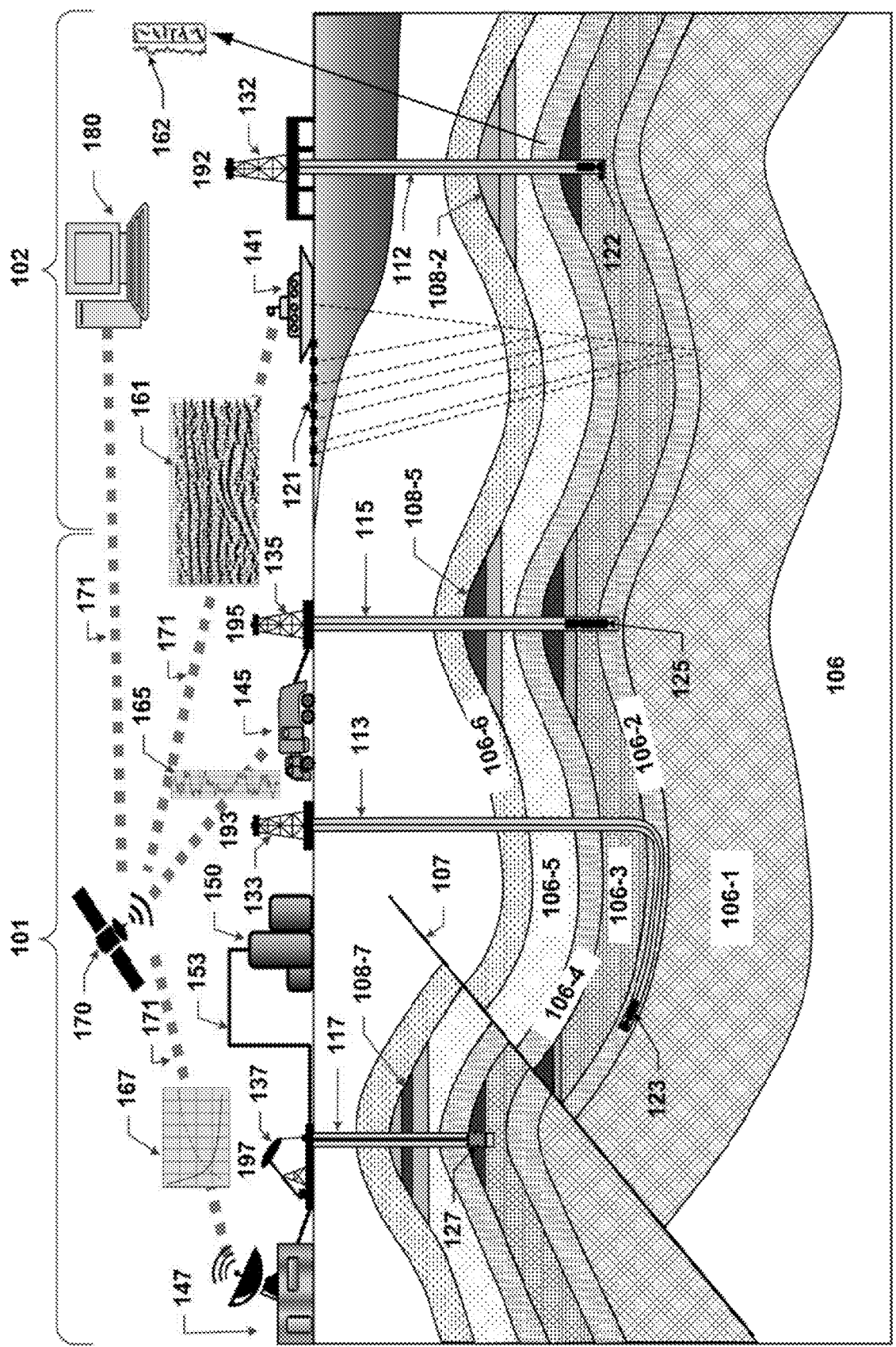
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to assessing geological similarity of wells employing well log data. In one or more embodiments, logs are gamma ray logs that record gamma-ray emissions as a function of borehole depth. Chronostratigraphic markers are identified in the logs. Signatures are extracted from the logs based on the chronostratigraphic markers. The signatures are compared using dynamic time warping distances to determine the similarities between signatures. Agglomerative clustering is applied to the signatures using the dynamic time warping distances to generate clusters of similar signatures. The clusters are filtered, given a coding scheme, and can be displayed on one or more maps.

Comparing signatures without using dynamic time-warping may lead to incorrect clustering because the signatures are of different lengths. Specifically, with different lengths, a difficulty exists to do a simple comparison between signatures since a longer signature will have extra data is not compared against a shorter signature. Without comparing the data of the signatures, clustering algorithms may make incorrect decisions about which signatures belong to which clusters and create deficient cluster models. One or more embodiments are directed to the system described above in order for a computing system to FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 8.1 and 8.2 and described below.

Figure 2:
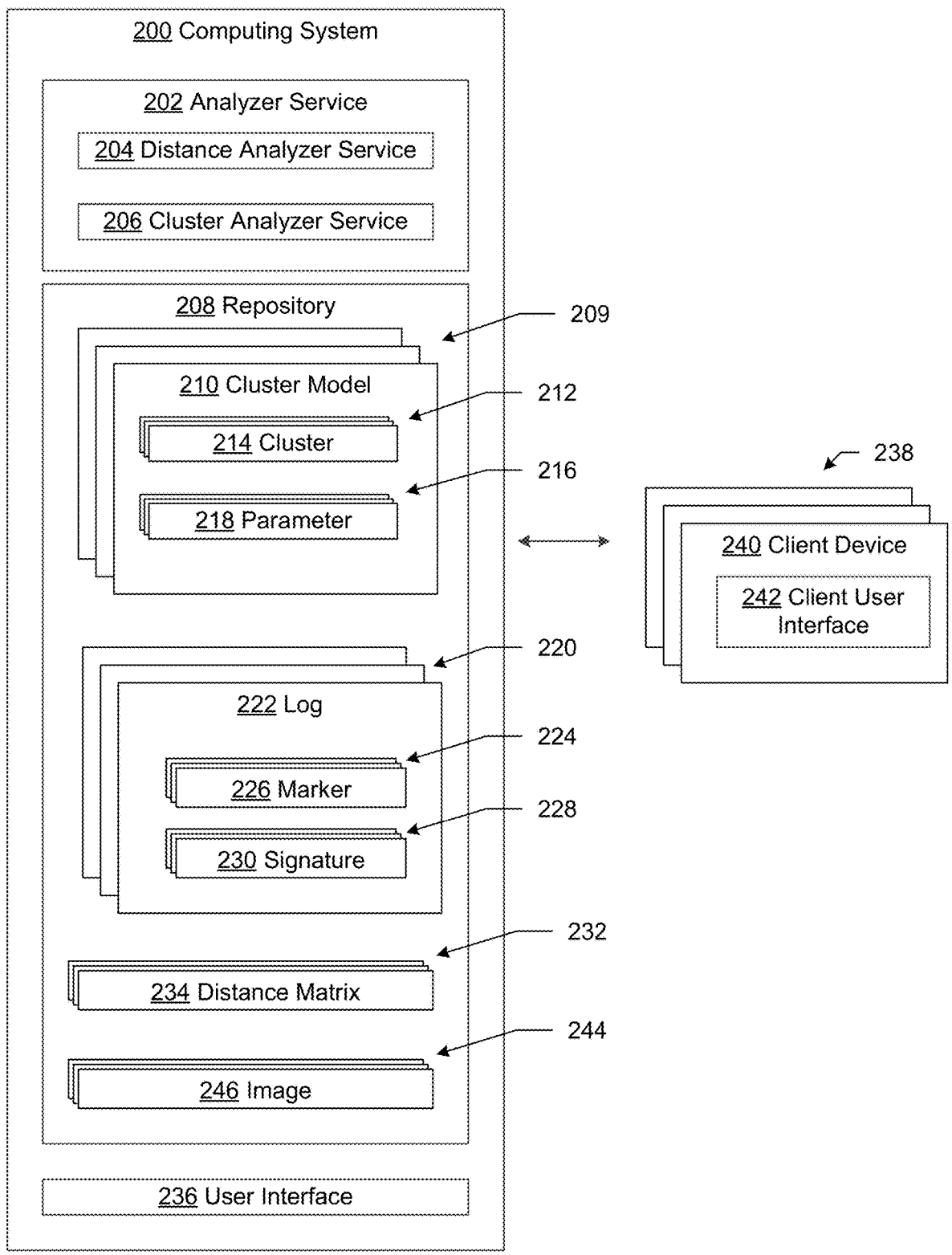
FIG. 2 shows a diagram of a system in accordance with disclosed embodiments.

FIG. 2 shows a diagram of one or more embodiments that are in accordance with the disclosure. The various elements, systems, and components shown in FIG. 2 may be omitted, repeated, combined, and/or altered as shown from FIG. 2. Accordingly, the scope of the present disclosure should not be considered limited to the specific arrangements shown in FIG. 2.

FIG. 2 shows a computing system (200), which may be the same as the computing system (180) in FIG. 1. The hardware components of the computing system (200) is described in further detail below and in FIGS. 8.1 and 8.2. The computing system (200) includes the analyzer service (202), the repository (208), and the user interface (236), which are described below. The computing system (200) communicates with the client devices (238), which are described below. In one or more embodiments, the computing system (200) is a stand-alone computing system, such as a desktop computer or laptop computer, that performs the analysis and the presentation of the data stored in the repository (208). In additional embodiments, the computing system (200) is part of a cloud computing environment that performs the analysis and then presents the data to the client devices (238).

The analyzer service (202) is a collection of one or more programs or software routines that are executed by the computer system (200) to analyze the logs (220), generate the distance matrices (232) and generate the cluster model (210). In one or more embodiments, the analyzer service (203) includes the distance analyzer service (204) and the cluster analyzer service (206). In one or more embodiments, the analyzer service (202) generates the signatures (228) from the logs (220) based on the markers (224).

The distance analyzer service (204) is a program executing on the computing system (200). In one or more embodiments, the distance analyzer service (204) is invoked by the analyzer service (202) to analyze the signatures (228) of the logs (220) and generate the distance matrices (232), which is further described below.

The cluster analyzer service (206) is a program executing on the computing system (200). In one or more embodiments, the cluster analyzer service (206) is invoked by the analyzer service (202) to analyze the distance matrices (232) and generate the cluster models (209).

The repository (208) is any type of storage unit and/or device (e.g., a file system, database, collection of tables, or any other storage mechanism) for storing data. Further, the repository (208) may include multiple different storage units and/or devices. The multiple different storage units and/or devices may or may not be of the same type or located at the same physical site. The repository (208) stores the cluster models (209), logs (220), and distance matrices (232), which are described below.

The cluster models (209) are the cluster models generated from the logs (220). In one or more embodiments, multiple different cluster models, that are different from each other, are generated from the logs (220) using one or more different cluster model parameters, different log markers, different log signatures, different distance matrices, etc. The cluster models (209) include the cluster model (210).

The cluster model (210) includes the clusters (212) and the parameters (216). A cluster is a collection of similar log signatures. In one or more embodiments, the cluster model (210) is generated from the logs (220) using the distance matrix (234). In one or more embodiments, the cluster model (210) is a hierarchical clustering model that builds a hierarchy of clusters. In other words, the clusters are hierarchically arranged in the cluster model. In one or more embodiments, the cluster model (210) is agglomerative and is built from the bottom up starting with clusters that include single log signatures that are successively paired by the shortest distance between clusters. In one or more embodiments, the distances between the clusters (212) of the cluster model (210) are determined using the distance matrix (234).

The cluster model (210) uses a linkage criterion to identify the distance between clusters. Linkage criteria include complete linkage clustering, single linkage clustering, average linkage clustering, etc. Complete linkage clustering identifies the distance between clusters as the maximum distance between two different signatures in two different clusters of the pair of clusters. Single linkage clustering identifies the distance between clusters as the minimum distance between two different signatures in two different clusters of the pair of clusters. Average linkage clustering identifies the distance between clusters as the average distance between pairs of signatures from the two different clusters of the pair of clusters. In one or more embodiments, the metric used to determine the distance between the signatures within the clusters is the dynamic time warping distance between the signatures, which is discussed further below.

The clusters (212) are collections of log signatures. The clusters (212) define collections of similar log signatures. Given two clusters that do not share the same log signatures, a log signature in one cluster shares more similarity with the other log signatures in the cluster than with the log signatures in the other cluster. The clusters (212) are hierarchical and individual clusters are supersets of other clusters sharing the same signatures.

The cluster (214) is one of the clusters (212). In one or more embodiments, the cluster (214) includes the signature (230) from the log (222). The cluster includes one or more log signatures. In one or more embodiments, the cluster (214) is embodied as a label that is tagged to the signatures that are part of the cluster (214).

The parameters (216) define one or more characteristics of the cluster model (210).

In one or more embodiments, parameters (216) include an identifier for the type of linkage, identifiers for the start and end markers used to extract the signatures from the logs (220), a threshold, and a coding scheme. In one or more embodiments, the threshold identifies a maximum distance between clusters for filtering the clusters (212) of the cluster model (210). In one or more embodiments, the coding scheme is a set of colors that are assigned to one or more clusters (212) for presenting the clusters (212). The parameters (216) include the parameter (218).

The logs (220) are embodiments of the static data plots (165) of FIG. 1. In one or more embodiments, the logs (220) are gamma ray logs that are records of the gamma-ray emissions along the depth of a borehole or drill hole. The logs (220) include the log (222), which includes the markers (224) and the signatures (228). In one or more embodiments, the log (220) is a set of data items. In one or more embodiments, a data item of the log (220) identifies a borehole depth and a gamma ray emission magnitude at the borehole depth. One or more embodiments can measure different or additional physical properties of the borehole including porosity and resistivity.

The markers (224) are chronostratigraphic markers that correlate the age of rock strata in relation to time. The markers (224) are identified within the log (222) to correlate the age of the rock at various depths to the depth of the borehole recorded on the gamma ray log (222).

The signatures (228) are sections of the log (222) that include the data items from the log (222) that are between two selected markers (224). In one or more embodiments, the signatures (228) include the data items that correspond to the selected markers (224). Different signatures use different markers to identify the bounds of the signature within the log (222). The signatures (228) include the signature (230).

The distance matrices (232) record the distances between homogeneous signatures from different logs. Signatures are homogeneous when the same chronostratigraphic markers are used to extract the signatures. The distance matrices (232) include the distance matrix (234). In one or more embodiments, the distance matrix (234) is a square matrix that includes rows and columns for the individual logs (220). The elements of the distance matrix (234) identify the distances between the logs specified by the rows and the logs specified by the columns of the distance matrix (234).

The images (244) include the image (246). The images (244) incorporate information generated by the analyzer service (202). In one or more embodiments, the images (244) include maps that identify the location of the wells that correspond to the logs (220). The locations identified on the maps for the logs (220) include coding schemes that identify the clusters of the signatures of the logs. In one or more embodiments, the images are geo distribution maps that use the locations of the wells with a color coding scheme for clusters. In one or more embodiments, the identified clusters are used as a third dimension to the geo distribution maps. In one or more embodiments, the three dimensions are plotted as X: distribution over longitudinal axis, Y: distribution over the latitudinal axis, Color: distribution of the clusters (e.g., different clusters are shown with different colors). Geo distribution may be displayed using interpolation algorithms, such as kriging, or using boundary identification algorithms, such as segmentation, to predict the colors, clusters, and stratigraphic layers between well sites on the geo distribution maps.

The user interface (236) provides for the presentation of the data of the computing system (200). In one or more embodiments, the computing system is a standalone computing system and the user interface includes a graphical user interface presented on a display of the computing system (200) with user interface elements to interact with the data on the computing system (200). In one or more embodiments, the computing system (200) is a server system that presents the data by packaging and sending the data to the client devices (238) where the data is displayed. The data can be packaged using a markup language, including extensible markup language (XML) and the hypertext markup language (HTML).

The client devices (238) include the client device (240), which is an embodiment of the computer system (180) of FIG. 1 and the computing system (800) of FIG. 8.1. In one or more embodiments, the client devices (238) communicate with the computing system (200) to engage and operate the analyzer service (202) and display analyzed information. The client devices (238) can display data from the repository (212), including the cluster models (209), the logs (222), and the distance matrices (232) entities (214), the schemas (218), the graph (222), the transformations (226), etc. The client devices (238) can display the progress of the analyzer engine (208) and the transformation engine (210).

FIG. 3, FIG. 4, FIG. 5, and FIG. 6 show flowcharts in accordance with one or more embodiments of the disclosure. While the various blocks in these flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not require a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

Figure 3:
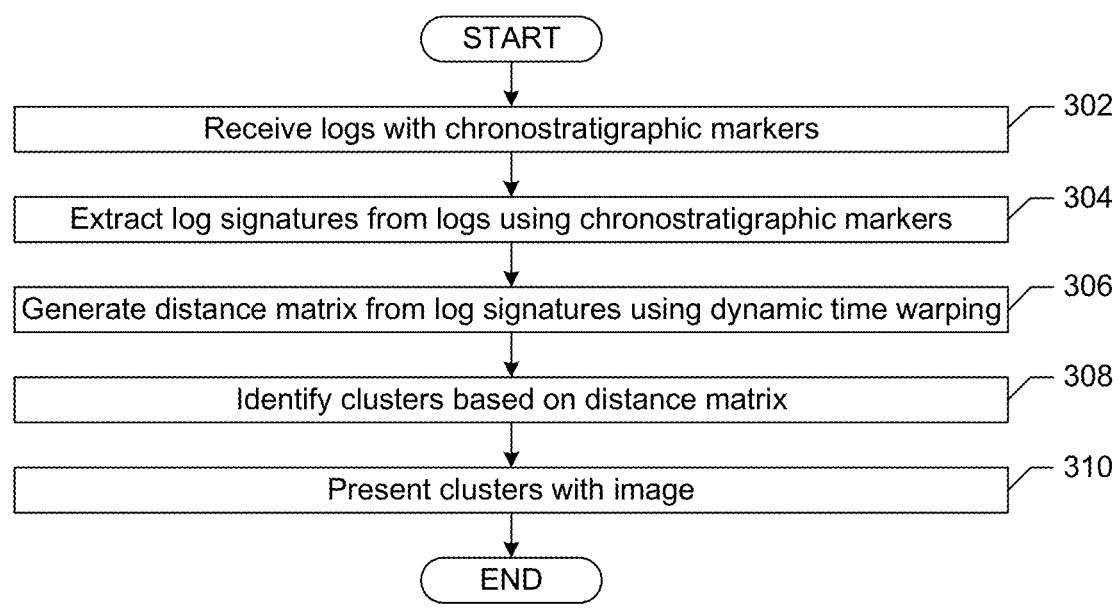
FIGS. 3, 4, 5, and 6 show flowcharts in accordance with disclosed embodiments.

Turning to FIG. 3, FIG. 3 shows a flowchart in accordance with one or more embodiments of the disclosure. FIG. 3 describes analyzing and presenting log signatures.

In Block 302, logs are received. In one or more embodiments, the analyzer service retrieves the logs from a database. As described with respect to FIG. 1, the logs are well logs generated by the equipment at oil wells. The well logs can be stored in a database that is accessible to a computer system hosting the analyzer service. The logs include chronostratigraphic markers, which in one or more embodiments, can be identified by a geologist. The chronostratigraphic markers are identified by looking at a combination of well log data, bio-markers in core data (e.g., paleo-pollens and fossil indicators of a specific depositional age), and regional information.

In Block 304, signatures are extracted from the logs using the chronostratigraphic markers. In one or more embodiments, two chronostratigraphic markers are selected that identify the time period of the signatures to be extracted from the logs. In one or more embodiments, selection is made with a user interface that presents the available chronostratigraphic markers. For the individual logs, the analyzer service identifies a section of a log that is between the two selected chronostratigraphic markers and saves that section of the log as the signature identified by the selected chronostratigraphic markers.

In Block 306, distance matrices are generated from log signatures using dynamic time warping. The signatures of different logs correspond to different wells. The chronostratigraphic markers for different wells can occur at different depths. With the chronostratigraphic markers at different depths, the signatures for different wells can start and end at different depths and have different lengths. For example, a first signature can start at 6500 feet and end at 6600 feet and a second signature can start at 6700 feet and end at 6900 feet using the same chronostratigraphic markers to identify the start and end of the signatures. Dynamic time warping is used to correlate the signatures that use the same chronostratigraphic markers and have different depths, and is further described below. The use of dynamic time warping mitigates the effect of the differences in depth for the chronostratigraphic markers between signatures and can output a distance between two signatures even when the signatures occur at different depths and have different lengths.

In Block 308, clusters are identified based on distance matrices. In one or more embodiments, the clusters of a cluster model are generated using a distance matrix, which is further described below.

In Block 310, clusters are presented with images. In one or more embodiments, and image is generated by the analyzer service that identifies the location and cluster of the wells that correspond to the signatures, which is further discussed below.

Figure 4:
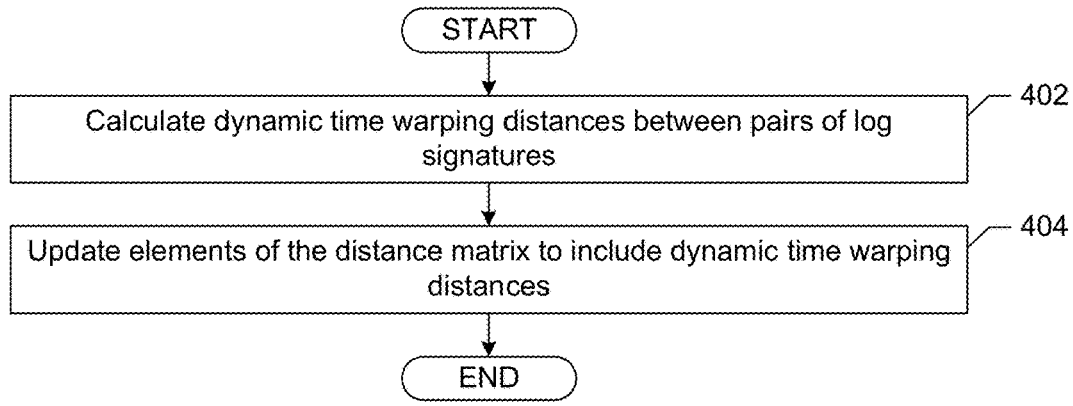

Turning to FIG. 4, FIG. 4 shows a flowchart in accordance with one or more embodiments of the disclosure. FIG. 4 describes generating a distance matrix from log signatures using dynamic time warping.

In Block 402, dynamic time warping between pairs of log signatures are calculated. The signatures are "warped" non-linearly in the time dimension to determine a measure of their similarity independent of non-linear variations in the time dimension.

Dynamic time warping calculates an optimal match between two signatures using a set of rules. In one or more embodiments, the rules include:

1. Data items from the first signature are to be matched with one or more items from the other signature, and vice versa.
2. The first item from the first signature must be matched with the first item from the other signature and does not have to be the only match.
3. The last item from the first signature must be matched with the last item from the other signature and does not have to be the only match.
4. The mapping of the items from the first signature to items from the other signature must be monotonically increasing, and vice versa.

The optimal match is denoted by the match that satisfies the set of rules and that has a minimal cost. The cost is computed as the sum of absolute differences between the values of matched pairs of items.

In Block 404 elements of the distance matrix are updated to include dynamic time warping distances. The distance matrix includes rows and columns for the signatures. Elements, except those along the main diagonal whose distances are zero, are updated to include the dynamic time warping distance calculated between the signatures of the row and the signature of the column for the element.

Figure 5:
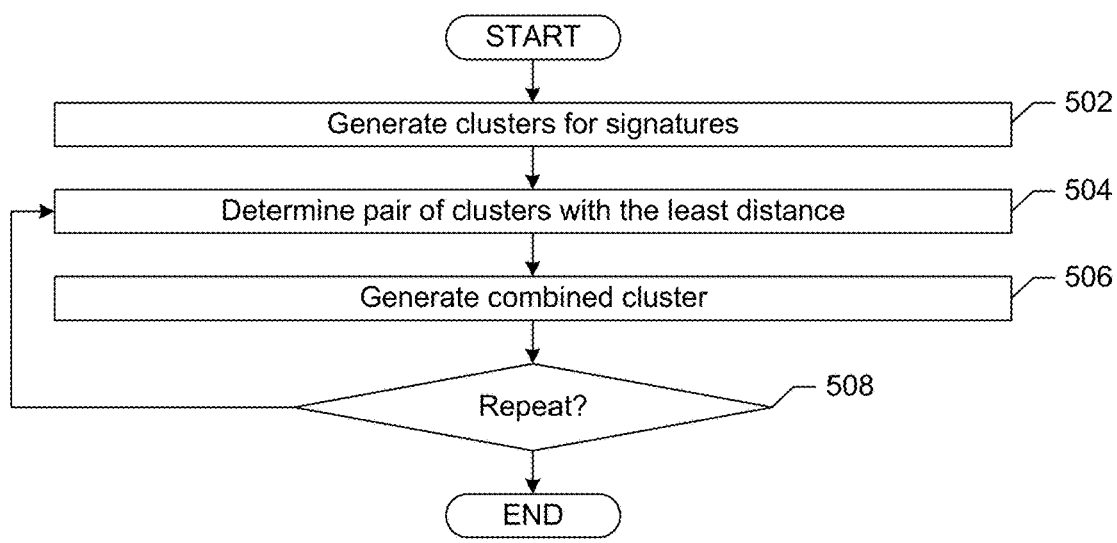

Turning to FIG. 5, FIG. 5 shows a flow chart in accordance with one or more embodiments of the disclosure. FIG. 5 describes identifying clusters based on a distance matrix using agglomerative clustering.

In Block 502, clusters are generated for signatures. In one or more embodiments, the cluster analyzer service creates a set of initial clusters. An initial cluster corresponds to an individual signature.

In Block 504, a pair of clusters with the least distance is determined. In one or more embodiments, the cluster analyzer service compares pairs of clusters until the pair of clusters with the least distance is found. To compare a pair of clusters that includes a first cluster and a second cluster, the signatures for the first cluster are identified and the signatures for the second cluster are identified. The distances between the first cluster signatures and the second cluster signatures are compared based on the type of linkage specified in the parameters of the cluster model. For example, with complete linkage clustering, the first cluster signature and second cluster signature with a maximum distance is identified as the distance between the first cluster and the second cluster. After determining the distances between the pairs of clusters, the pair of clusters with the least distance (i.e., the least maximum distance between a first and second cluster signatures when using complete linkage clustering) is identified as the pair of clusters with the least distance.

In Block 506, a combined cluster is generated. In one or more embodiments, the cluster analyzer service generates the combined cluster from the pair of clusters with the least distance. The combined cluster includes the signatures from the pair of clusters.

In Block 508, it is determined whether to repeat determining the pair of clusters with the least distance and generating combined clusters. The determining and generating are repeated when two or more clusters remain to be analyzed. In one or more embodiments, the cluster analyzer service maintains a list of clusters to be analyzed. The list of clusters is initiated with the set of initial clusters that were generated for the signatures. After one iteration, the list of clusters is updated to remove the pair of clusters having the least distance and to add the combined cluster created from the pair of clusters. When the list of clusters includes a single cluster, the determining and generating are no longer repeated.

Figure 6:
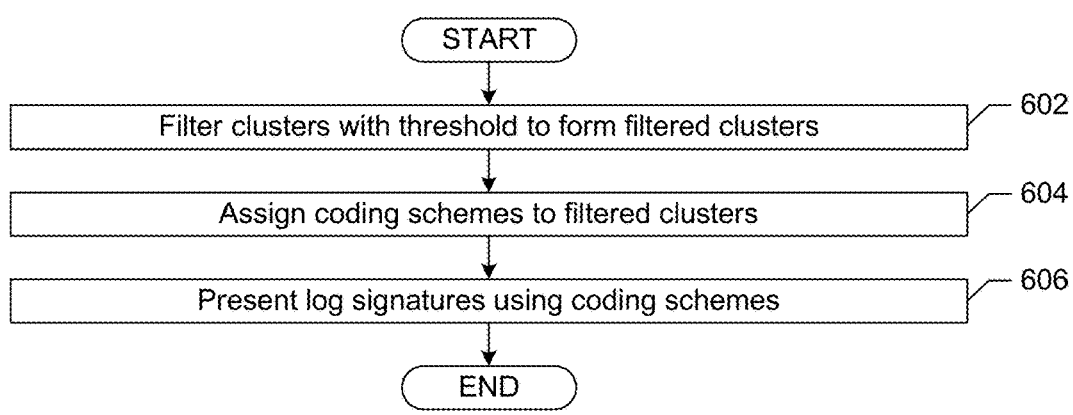

Turning to FIG. 6, FIG. 6 shows a flow chart in accordance with one or more embodiments of the disclosure. FIG. 6 describes presenting clusters with images.

In Block 602, clusters are filtered with a threshold to form a set of filtered clusters. In one or more embodiments, the threshold is a distance threshold to select clusters with maximum distances that are less than the distance threshold to form the set of filtered clusters. In one or more embodiments, the distance of a cluster that is compared to the threshold is the distance between the pair of clusters that were used to form the cluster. In one or more embodiments, after filtering out the clusters with distances above the distance threshold, the subordinate clusters are removed. Subordinate clusters are the clusters that were combined to form a combined cluster. A cluster is a subordinate cluster to another cluster when the other cluster includes the set of signatures of the subordinate cluster.

In Block 604, coding schemes are assigned to filtered clusters. In one or more embodiments, the coding schemes are colors that are assigned to the filtered clusters. In one or more embodiments, the colors assigned to the filtered clusters are unique so that no two filtered clusters have the same color.

In Block 606, signatures are presented using the coding schemes. In one or more embodiments, after assigning the coding schemes to be filtered clusters, the coding schemes are passed down to the signatures within the filtered clusters. The signatures are related to well logs, which are related to wells, which have longitude and latitude location values and can be identified on a map. In one or more embodiments, the coding schemes for the signatures are overlaid on to a map based on the longitude and latitude of the wells that correspond to the signatures. In one or more embodiments, the coding schemes are interpolated to the areas between wells on the map using nearest neighbor interpolation, linear interpolation, polynomial interpolation, etc.

FIGS. 7.1 through 7.6 show diagrams of one or more embodiments that are in accordance with the disclosure. The various elements, features, systems, components, and interfaces shown in FIGS. 7.1 through 7.6 may be omitted, repeated, combined, and/or altered as shown from FIGS. 7.1 through 7.6. Accordingly, the scope of the present disclosure should not be considered limited to the specific arrangements shown in FIGS. 7.1 through 7.6.

Referring to FIG. 7.1, the user interface (702) is updated to display a dynamic time warping distance between two signatures. In one or more embodiments, the user interface (702) is displayed in response to a selection of the two signatures.

The signature (704) is a first signature from a first log related to a first well. The signature (704) is from a gamma ray log with the first axis (depicted horizontally) related to borehole depth and the second axis (depicted vertically) related to the magnitude of gamma ray emissions at the borehole depth.

The signature (706) is a second signature from a second log related to a second well. The signature (706) is from a gamma ray log with the first axis (depicted vertically) related to borehole depth and the second axis (depicted horizontally) related to the magnitude of gamma ray emissions at the borehole depth.

The signatures (704, 706) were extracted from different logs for different wells using the same start and end chronostratigraphic markers. The signatures (704, 706) do not include the start and end chronostratigraphic markers but do include a chronostratigraphic marker (708) within the signatures (704, 706) labeled as the "NIOBRARA" marker (708).

The grid (710) provides a visual image of the dynamic time warping distance between the signatures (704, 706). The first axis (depicted horizontally) of the grid (710) corresponds to the first axis of the first signature (704). The second axis (depicted vertically) of the grid (710) corresponds to the first axis of the second signature (706). The grid (710) is a grid of elements that represent the distances between the data items of the signatures (704, 706). In one or more embodiments, the elements include colors that represent the distance with darker colors indicating a closer proximity between data items of the two signatures (704, 706) as compared to lighter colors.

The first signature (704) includes more data items than the second signature (706). This is shown on the grid (710) with the first axis of the grid (710) (depicted horizontally) having six squares as compared to the second axis of the grid (710) (depicted vertically) having less than six squares. The grid (710) includes the warping path (712). The warping path (712) represents the path with the least total distance or cost from the bottom left of the grid (710) to the top right.

Referring to FIG. 7.2, the user interface (702) is updated to display the distance matrix (722). In one or more embodiments, the user interface (702) is updated to display the distance matrix (722) in response to the selection of the distance matrix (722) from the repository.

The distance matrix (722) is a square triangular matrix with the values along the main diagonal from top left to bottom right being zero. The rows and columns of the distance matrix (720) correspond to the signatures extracted from the logs being analyzed over a chronostratigraphic period defined by chronostratigraphic markers.

The elements of the distance matrix (720) are shaded with a color that is described by the legend (724). The legend (724) indicates that darker colors represent smaller distances as compared to lighter colors.

Referring to FIG. 7.3, the user interface (702) is updated to display the dendogram (732). In one or more embodiments, the user interface (702) is updated to display the dendogram (732) in response to one or more of the selection of a cluster model from the repository and the completion of the generation of the cluster model by the analyzer service.

The dendogram (732) depicts the clusters that were generated from the signatures (734). The first axis (depicted horizontally) of the dendogram (732) identifies the distance between the pair of clusters used to form a combined cluster. For example the distance between the clusters (736, 738) is about 70. The rows of the second axis (depicted vertically) identify the signatures (734) that make up the clusters in the dendogram (732).

The clusters in the dendogram (732) include the filtered clusters (736-746). The filtered clusters (736-746) are identified using a distance threshold of 50 to filter out the clusters with distances greater than 50 and by removing the remaining subordinate clusters. The subordinate cluster (748) is subordinate to the filtered cluster (736), i.e., the filtered cluster (736) includes the set of signatures that make up the subordinate cluster (748). In one or more embodiments, the filtered clusters (736-746) are displayed with a coding scheme where the filtered clusters (736-746) and their corresponding subordinate clusters are displayed with a distinct color.

The signatures (734) include the signatures (750, 752, 754). The signatures (750, 752, 754) can be selected in order to display and compare the visual representations of the signatures. The signatures (750, 752) form part of the cluster (736) and the signature (754) forms part of the cluster (744).

Referring to FIG. 7.4, the user interface (702) is updated to display the signatures (750, 752, 754). In one or more embodiments, the user interface (702) is updated to display the signatures (750, 752, 754) in response to selecting the signatures (750, 752, 754) from the dendogram (732).

The signatures (750, 752, 754) are displayed with the chronostratigraphic marker (708). A first axis (depicted vertically) corresponds to the depth of the borehole. The depths of the signatures (750, 752, 754) are not aligned as seen by the chronostratigraphic markers (708) occurring at different depths within the signatures (750, 752, 754). The signatures (750, 752, 754) are rescaled so that even though the signatures are from different depths, the first axes for the depths for the signatures (750, 752, 754) have the same relative units. For example, 25 feet of relative depth is the same length for each of the signatures (750, 752, 754).

The signature (750) and the signature (752) form part of the cluster (736). The signature (754) is in a different cluster, the cluster (744). The similarity between the signature (752) and the signature (750) is greater than the similarity between the signature (752) and the signature (754).

Referring to FIG. 7.5, the user interface (702) is updated to display the map (760). In one or more embodiments, the user interface (702) is updated to display the map (760) in response to selecting a cluster model from the repository.

The map (760) includes a set of signatures depicted as circles on the map (760). The signatures are located on the map (760) in accordance with the locations of the wells from which the logs were generated from which the signatures were extracted. The signatures displayed on map (760) include the signatures (750, 752, 754). The signatures are displayed using a coding scheme that uses colors to identify the clusters to which signatures belong. In one or more embodiments, the coding scheme from the dendogram (732) is the color scheme used with the signatures on the map (760). In one or more embodiments, in response to selecting the signatures (750, 752, 754) on the map (760), the user interface (702) updates to display the signatures (750, 752, 754) as depicted in FIG. 7.4. In one or more embodiments, selecting the map (760) causes the user interface to display the map (770) of the FIG. 7.6.

Referring to FIG. 7.6, the user interface (702) is updated to display the map (770). In one or more embodiments, the user interface (702) is updated to display the map (770) in response to selecting a cluster model from the repository.

The map (770) displays a geographical area with an overlaid coding scheme. Instead of the colors of the coding scheme being limited to the locations of the wells associated with the signatures, as in the map (760) from FIG. 7.5, the colors of the areas between the wells are interpolated from the colors at the wells. For example, when nearest neighbor interpolation is used, a pixel on the map (770) has the color of the well that is nearest to the pixel.

The area (772) displayed on map (770) identifies the geographical area of the map (760) from FIG. 7.5. In one or more embodiments, selecting the area (772) causes the user interface to display the map (760) from FIG. 7.5.

Embodiments may be implemented on a computing system. Any combination of mobile, desktop, server, router, switch, embedded device, or other types of hardware may be used. For example, as shown in FIG. 8.1, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (800) in FIG. 8.1 may be connected to or be a part of a network. For example, as shown in FIG. 8.2, the network (820) may include multiple nodes (e.g., node X (822), node Y (824)). Nodes may correspond to a computing system, such as the computing system shown in FIG. 8.1, or a group of nodes combined may correspond to the computing system shown in FIG. 8.1. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (800) may be located at a remote location and connected to the other elements over a network.

Although not shown in FIG. 8.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8.1. Further, the client device (826) may include and/or perform at least a portion of one or more embodiments of the disclosure.

The computing system or group of computing systems described in FIGS. 8.1 and 8.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 8.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8.1, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then A−B>0). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8.1 and the nodes and/or client device in FIG. 8.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
receiving a plurality of logs with chronostratigraphic markers;
extracting a plurality of signatures from the plurality of logs using the chronostratigraphic markers;
correlating a set of signatures, from the plurality of signatures, using dynamic time warping to generate a distance matrix from the plurality of signatures,
wherein the set of signatures use a same chronostratigraphic marker from the chronostratigraphic markers, and
wherein the set of signatures are for varying depths;
generating a set of clusters using the distance matrix; and
presenting the set of clusters with an image.

2. The method of claim 1, further comprising:
identifying two chronostratigraphic markers in a log of the plurality of logs, wherein the two chronostratigraphic markers comprise a start marker and an end marker and correspond to at least two signatures, from the set of signatures, at different depths.

3. The method of claim 2, further comprising:
extracting a signature of the plurality of signatures from a portion of the log that is between the two chronostratigraphic markers.

4. The method of claim 1, further comprising:
generating the distance matrix by:
calculating a dynamic time warping distance between each pair of signatures of the plurality of signatures to form a plurality of dynamic time warping distances; and
updating elements of the distance matrix to include the plurality of dynamic time warping distances.

5. The method of claim 1, further comprising:
identifying the set of clusters by:
generating a cluster for each signature of the plurality of signatures to form the set of clusters; and
determining a pair of clusters with a least distance from the set of clusters.

6. The method of claim 5,
wherein identifying the set of clusters further comprises:
generating a combined cluster for the pair of clusters and updating the set of clusters with the combined cluster.

7. The method of claim 6,
wherein identifying the set of clusters further comprises:
repeating the determining a pair of clusters and generating a combined cluster until a cluster of the set of clusters includes each of the signatures.

8. The method of claim 1, further comprising:
presenting the set of clusters by:
filtering the set of clusters with a distance threshold to select clusters with maximum distances that are less than the distance threshold and form a set of filtered clusters.

9. The method of claim 8,
wherein presenting the set of clusters further comprises:
assigning a coding scheme to each filtered cluster of the set of filtered clusters.

10. The method of claim 9,
wherein presenting the set of clusters further comprises:
presenting the signatures using the coding schemes of the set of filtered clusters.

11. A system comprising:
a memory coupled to a processor;
an analyzer service that executes on the processor, uses the memory, and is configured for:
receiving a plurality of logs with chronostratigraphic markers;
extracting a plurality of signatures from the plurality of logs using the chronostratigraphic markers;
correlating a set of signatures, from the plurality of signatures, using dynamic time warping to generate a distance matrix from the plurality of signatures,
wherein the set of signatures use a same chronostratigraphic marker from the chronostratigraphic markers, and
wherein the set of signatures are for varying depths;
generating a set of clusters using the distance matrix; and
presenting the set of clusters with an image.

12. The system of claim 11, wherein the analyzer service is further configured for:
identifying two chronostratigraphic markers in a log of the plurality of logs, wherein the two chronostratigraphic markers comprise a start marker and an end marker and correspond to at least two signatures, from the set of signatures, at different depths.

13. The system of claim 12, wherein the analyzer service is further configured for:
  extracting a signature of the plurality of signatures from a portion of the log that is between the two chronostratigraphic markers.

14. The system of claim 11, wherein the analyzer service is further configured for:
  generating the distance matrix by:
    calculating a dynamic time warping distance between each pair of signatures of the plurality of signatures to form a plurality of dynamic time warping distances; and
    updating elements of the distance matrix to include the plurality of dynamic time warping distances.

15. The system of claim 11, wherein the analyzer service is further configured for:
  identifying the set of clusters by:
    generating a cluster for each signature of the plurality of signatures to form the set of clusters; and
    determining a pair of clusters with a least distance from the set of clusters.

16. The system of claim 15,
  wherein identifying the set of clusters further comprises:
    generating a combined cluster for the pair of clusters and updating the set of clusters with the combined cluster.

17. The system of claim 16,
  wherein identifying the set of clusters further comprises:
    repeating the determining a pair of clusters and generating a combined cluster until a cluster of the set of clusters includes each of the signatures.

18. The system of claim 11, wherein the analyzer service is further configured for:
  presenting the set of clusters by:
    filtering the set of clusters with a distance threshold to select clusters with maximum distances that are less than the distance threshold and form a set of filtered clusters.

19. The system of claim 18,
  wherein presenting the set of clusters further comprises:
    assigning a coding scheme to each filtered cluster of the set of filtered clusters.

20. A non-transitory computer readable medium comprising computer readable program code for:
  receiving a plurality of logs with chronostratigraphic markers;
  extracting a plurality of signatures from the plurality of logs using the chronostratigraphic markers;
  correlating a set of signatures, from the plurality of signatures, using dynamic time warping to generate a distance matrix from the plurality of signatures using dynamic time warping,
    wherein the set of signatures use a same chronostratigraphic marker from the chronostratigraphic markers, and
    wherein the set of signatures are for varying depths;
  generating a set of clusters using the distance matrix; and
  presenting the set of clusters with an image.

* * * * *